(12) United States Patent
Johnson et al.

(10) Patent No.: US 6,229,892 B1
(45) Date of Patent: May 8, 2001

(54) SYSTEM AND METHOD FOR DETECTING UNAUTHORIZED ACCESS TO A PORTABLE ELECTRONIC DEVICE

(75) Inventors: Paul Johnson, Escondido; Steve Tidwell, Carlsbad, both of CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/244,256

(22) Filed: Feb. 3, 1999

(51) Int. Cl.$^7$ ................................................. H04M 1/00
(52) U.S. Cl. .................................. 379/451; 379/437
(58) Field of Search ................................ 379/451, 437, 379/433, 428, 447; 455/90, 575

(56) References Cited

U.S. PATENT DOCUMENTS 4,178,490 * 12/1979 Boenecke .......................... 379/451

* cited by examiner

Primary Examiner—Jack Chiang
(74) Attorney, Agent, or Firm—Phillip R. Wadsworth; Gregory D. Ogrod; Thomas M. Thibault

(57) ABSTRACT

A system and method for detecting an unauthorized attempt to access components in a housing of a portable electronic device. The housing is secured in a closed state by a mechanical fastener that couples a first portion of the housing to a second portion of the housing. The mechanical fastener has a top end disposed within a recess in the housing. A ball bearing is first disposed within the recess above the top end of the fastener, after which at least a portion of the recess is filled with a curable resin. Later, a portion of the housing proximate the recess is visually inspected. In response to the visual inspection, a determination is made as to whether there has been an unauthorized attempt to access components in the housing.

15 Claims, 2 Drawing Sheets

SYSTEM AND METHOD FOR DETECTING UNAUTHORIZED ACCESS TO A PORTABLE ELECTRONIC DEVICE

BACKGROUND OF THE INVENTION

I. Field of the Invention

The present invention relates generally to portable electronic devices that are sealed to prevent unauthorized tampering with components disposed within the device housing. More particularly, the present invention relates to a novel system and method for detecting if an unauthorized person has accessed or attempted to access components disposed within the housing of a portable electronic device.

II. Description of the Related Art

Some portable electronic devices such as secure mobile telephones are disposed within a housing that should not be opened by persons other than authorized service personnel. In order to maintain the security of such devices, it would be desirable to have a system that could be inexpensively implemented, and that could be used to determine whether an unauthorized person had attempted to gain access to the interior of the device by, for example, attempting to unscrew a fastener used to hold the housing together. The implementation of such a system would be useful not only for detecting unauthorized access attempts to the device housing, but also for deterring such unauthorized activities from occurring in the first place.

SUMMARY OF THE INVENTION

The present invention is directed to a system and method for detecting an unauthorized attempt to access components in a housing of a portable electronic device. The housing is secured in a closed state by a mechanical fastener that couples a first portion of the housing to a second portion of the housing. The mechanical fastener has a top end disposed within a recess in the housing. A ball bearing is first disposed within the recess above the top end of the fastener, after which at least a portion of the recess is filled with a curable resin. Later, a portion of the housing proximate the recess is visually inspected. In response to the visual inspection, a determination is made as to whether there has been an unauthorized attempt to access components in the housing. In a preferred embodiment, a determination is made that there has been an unauthorized attempt to access components in the housing if marks left by a drill bit are found in the visual inspection on the portion of the housing proximate the recess or if the ball bearing is found to be absent from the recess in the visual inspection.

BRIEF DESCRIPTION OF THE DRAWINGS

The features, objects and advantages of the present invention will become more apparent from the detailed description set forth below when taken in conjunction with the drawings in which like reference characters identify corresponding elements and wherein.

DETAILED DESCRIPTION OF THE PREFERRED EMBODIMENTS

Figure 1:
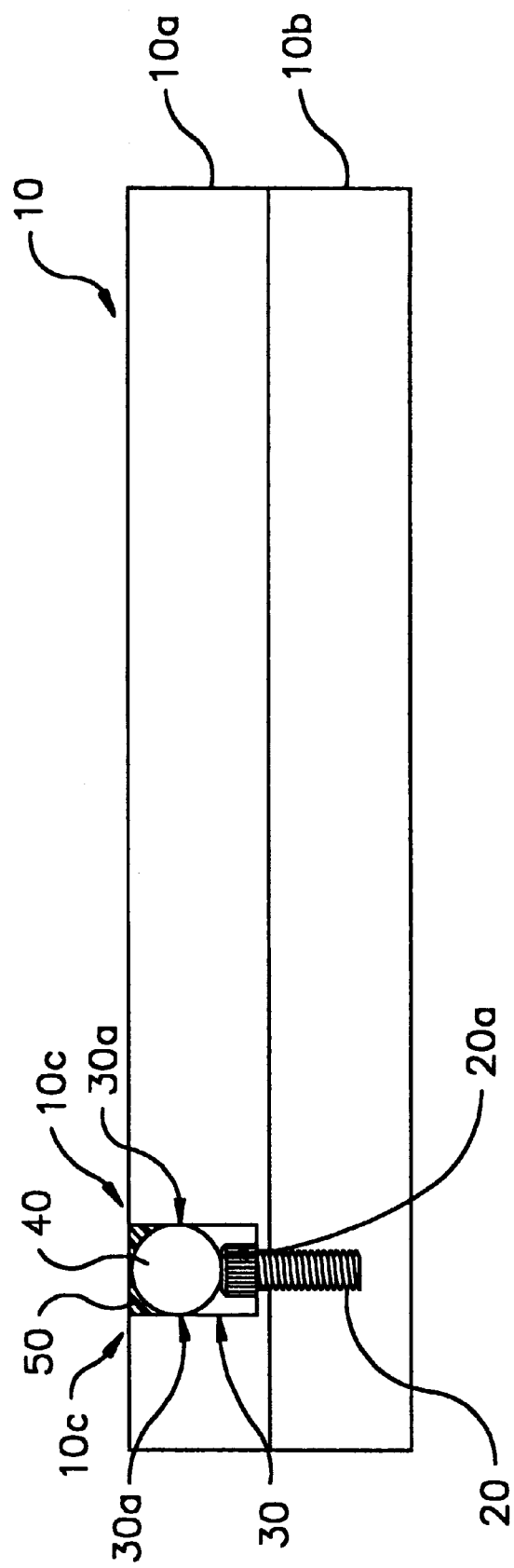
FIG. 1 is a cross-sectional view of a portable electronic device housing that includes a system for detecting an unauthorized attempt to access components in the interior of the housing, in accordance with a preferred embodiment of the present invention.

FIG. 1 is a cross-sectional view of a portable electronic device housing 10 that includes a system for detecting an unauthorized attempt to access components in the interior of the housing 10, in accordance with a preferred embodiment of the present invention. The portable electronic device disposed in the housing 10 is, for example, a mobile telephone handset. The housing 10 is secured in a closed state by a mechanical fastener 20 (e.g., a screw) that couples a first portion 10a of the housing to a second portion 10b of the housing. The mechanical fastener 20 has a top end 20a disposed within a recess 30 in the housing 10. A ball bearing 40 is disposed within the recess above the top end 20a of the fastener, and at least a portion of the recess is filled with a curable resin 50 (e.g., an epoxy). As explained more fully below in connection with FIG. 2, after the system shown in FIG. 1 is assembled and released from a manufacturing site, a portion 10c of the housing proximate the recess 30 is visually inspected for evidence of tampering. In response to the visual inspection, a determination is then made as to whether there has been an unauthorized attempt to access components in the housing.

Ball bearing 40 is designed to prevent a drill bit from reaching the top end 20a of the fastener 20. If an unauthorized person tries to drill through ball bearing 40, ball bearing 40 will simply spin in place, thereby not allowing a drill bit to bore into ball bearing 40 and onto top end 20a of fastener 20.

Figure 2:
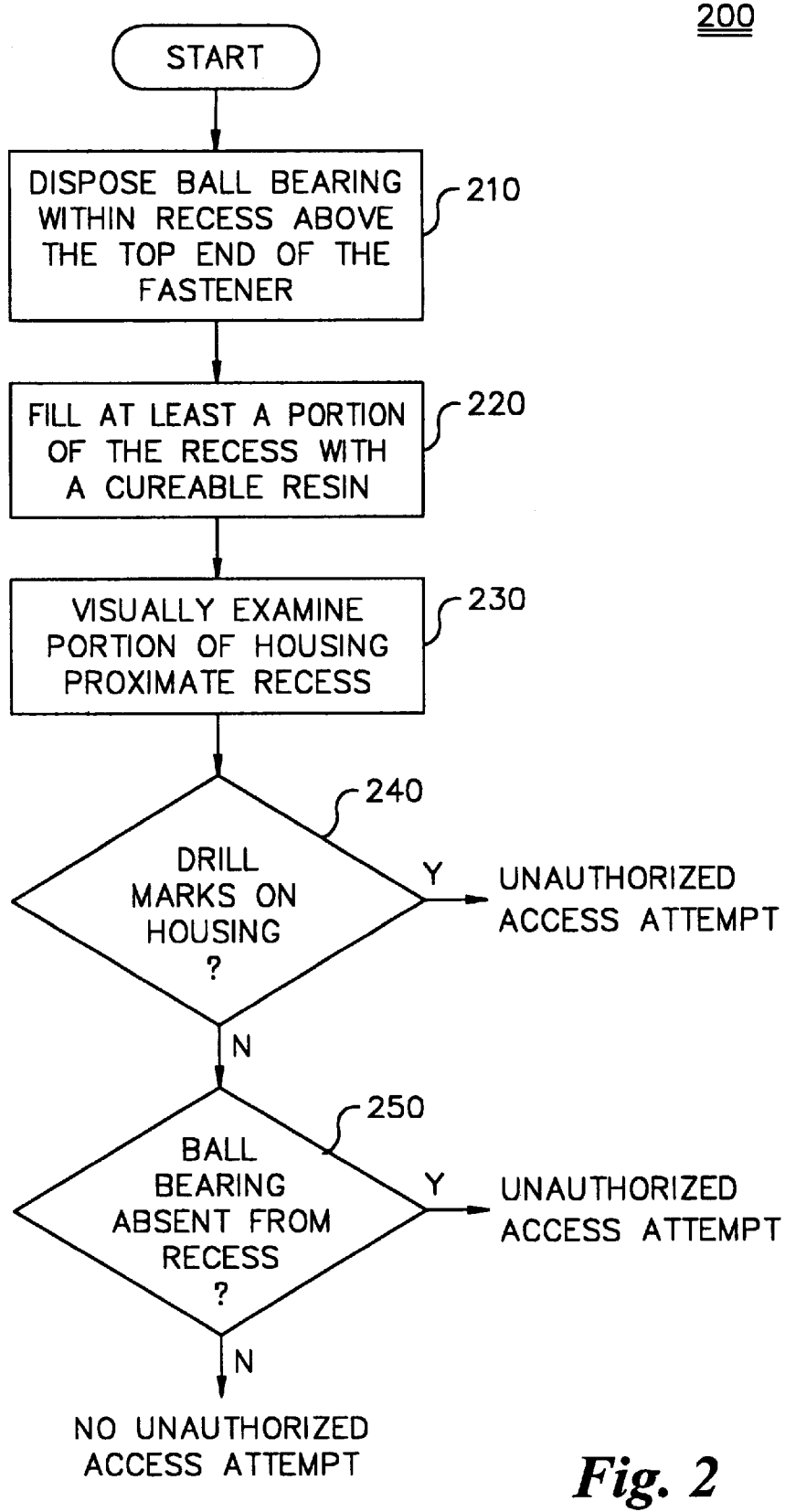
FIG. 2 is a flow diagram of a method for detecting an unauthorized attempt to access components in the interior of the housing, in accordance with a preferred embodiment of the present invention.

Referring now to FIG. 2, there is shown a flow diagram of a method 200 for detecting an unauthorized attempt to access components in the interior of the housing 10, in accordance with a preferred embodiment of the present invention. Initially, in step 210, the ball bearing 40 is disposed within the recess 30 above the top end 20a of the mechanical fastener 20. After being disposed in the recess 30, the ball bearing 40 preferably contacts the interior of the recess 30 along a circumference 30a of the recess. Next, in step 220, at least a portion of the recess 30 is filled with a curable resin 50, which is then permitted to cure. In a preferred embodiment, only the portion of the recess 30 above the circumference 30a is filled with the curable resin in step 220. The curable resin preferably has a viscosity that prevents the resin from penetrating the portion of the recess 30 below circumference 30a when the resin is disposed in a liquid state above circumference 30a. By limiting the resin to the portion of the recess above the circumference 30a, this aspect of the invention insures that the curable resin does not bond the top end 20a of the fastener to the ball bearing 40, thereby permitting easier removal of the ball bearing 40 later by authorized persons requiring access to the interior of the housing 10. Steps 210 and 220 are preferably performed at the time that the portable electronic device is being manufactured and prior to its release from the manufacturer.

Referring still to FIG. 2, in step 230, after the system shown in FIG. 1 is assembled and released from a manufacturing site, a portion 10c of the housing proximate the recess 30 is visually inspected for evidence of tampering. This step may occur, for example, when a user brings in the device for service. In this step, the portion 10c of the housing proximate the recess 30 is visually examined for marks left by a drill bit. Such marks would be present if, for example, an unauthorized person had attempted to gain access to the interior of housing 10 by attempting to drill past the cured resin 50 and through the ball bearing 40. In addition, in step 230 the recess 30 is visually examined for the presence of the ball bearing 40. The absence of the ball bearing 40 from the recess 30 represents an indication that an unauthorized user has gained or attempted to gain access to the interior of the housing 10 by removing the ball bearing 40 from the recess 30. In steps 240 and 250, a determination is made that there has been an unauthorized access attempt to the interior of the housing 10 if marks left by a drill bit are found in step 230 on the portion 10c of the housing proximate the recess 30 or if the ball bearing 40 is found to be absent from the recess 30 in step 230.

In accordance with a further aspect of the present invention, authorized service personnel may remove the ball bearing 40 (which has been secured with resin 50 to the recess 30) from recess 30 in order to gain access to the components in the interior of the housing and service the device. In order to remove the ball bearing 40 from recess 30, the authorized service personnel uses a drill bit to drill into the housing in area 10c immediately adjacent and circumferentially surrounding the recess 30. If only the portion of the recess 30 above the circumference 30a was filled with the curable resin in step 220, the authorized service personnel need only drill to the depth of the circumference 30a in order to remove the ball bearing 40 from the recess 30 and expose the top side 20a of the mechanical fastener 20. Once the ball bearing 40 is removed from the recess 30, the authorized service personnel can then remove the exposed mechanical fastener 20 in order to gain access to the interior of the housing and service the device. Although the drilling performed by the authorized service personnel is preferably accomplished in a manner that minimizes damage to the housing 10a during removal of the ball bearing 40, in cases where the housing 10a is damaged by such drilling, the authorized service personnel will preferably replace housing part 10a after the device has been serviced. Following any authorized servicing that requires removal of ball bearing 40 from the recess 30, the authorized service personnel preferably replaces the ball bearing 40 and the curable resin 50 in recess 30 (i.e., the authorized service personnel performs steps 210 and 220) before releasing the device back to the user.

The previous description of the preferred embodiments is provided to enable any person skilled in the art to make or use the present invention. Although the present invention has been described in conjunction with a portable telephone handset housing, the principles of the present invention may be applied in other contexts and applications. In addition, various modifications to the embodiments described above will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What we claim is:

1. A method for detecting an unauthorized attempt to access components in a housing of a portable electronic device, the housing being secured in a closed state by a mechanical fastener that couples a first portion of the housing to a second portion of the housing, the mechanical fastener having a top end disposed within a recess in the housing, comprising the steps of:

(A) disposing a ball bearing within the recess above the top end of the fastener;

(B) after step (A), filling at least a portion of the recess with a curable resin;

(C) after step (B), visually examining a portion of the housing proximate the recess; and (D) determining, in response to the result of step (C), whether there has been an unauthorized attempt to access components in the housing.

2. The method of claim 1, wherein step (C) comprises:

(C) after step (B), visually examining a portion of the housing proximate the recess for marks left by a drill bit.

3. The method of claim 2, wherein step (C) further comprises visually examining the recess for the presence of the ball bearing.

4. The method of claim 3, wherein step (D) comprises determining that there has been an unauthorized attempt to access components in the housing if marks left by a drill bit are found in step (C) on the portion of the housing proximate the recess or if the ball bearing is found to be absent from the recess in step (C).

5. The method of claim 1, wherein the portable electronic device is a mobile telephone.

6. The method of claim 1, wherein the mechanical fastener is a screw.

7. The method of claim 1, wherein the curable resin is an epoxy.

8. The method of claim 1, wherein after step (A) the ball bearing contacts the interior of the recess along a circumference of the recess, and step (B) comprises filling only a portion of the recess above the circumference with the curable resin.

9. The method of claim 1, further comprising the steps of:

(E) removing the ball bearing and the curable resin from the recess and then servicing the device; and (F) after the servicing of the device, repeating steps (A) and (B) prior to releasing the device to a user.

10. The method of claim 9, wherein the ball bearing is removed from the recess in step (E) using a drill bit.

11. A system for detecting an unauthorized attempt to access components in a housing of a portable electronic device, the housing being secured in a closed state by a mechanical fastener that couples a first portion of the housing to a second portion of the housing, the mechanical fastener having a top end disposed within a recess in the housing, comprising:

a ball bearing disposed within the recess above the top end of the fastener; and a curable resin surrounding at least a portion of said recess surrounding said ball bearing.

12. The system of claim 11, wherein the ball bearing contacts the interior of said recess along a circumference of said recess, and only the portion of said recess above said circumference is filled with said curable resin.

13. The system of claim 11, wherein the portable electronic device is a mobile telephone.

14. The system of claim 11, wherein the mechanical fastener is a screw.

15. The system of claim 11, wherein the curable resin is an epoxy.

\* \* \* \* \*